(12) United States Patent
Kumahashi

(10) Patent No.: US 11,249,693 B2
(45) Date of Patent: Feb. 15, 2022

(54) IMAGE FORMING APPARATUS AND CONTROL METHOD THEREFOR

(71) Applicant: CANON KABUSHIKI KAISHA, Tokyo (JP)

(72) Inventor: Shu Kumahashi, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/022,885

(22) Filed: Sep. 16, 2020

(65) Prior Publication Data

US 2021/0103411 A1 Apr. 8, 2021

(30) Foreign Application Priority Data

Oct. 2, 2019 (JP) .............................. JP2019-182449

(51) Int. Cl.
*G06F 15/00* (2006.01)
*G06K 15/00* (2006.01)
*G06K 1/00* (2006.01)
*G06F 3/12* (2006.01)

(52) U.S. Cl.
CPC ............ *G06F 3/1204* (2013.01); *G06F 3/122* (2013.01); *G06F 3/1248* (2013.01); *G06F 3/1275* (2013.01)

(58) Field of Classification Search
CPC ...... G06F 3/1204; G06F 3/122; G06F 3/1248; G06F 3/1275
USPC ............................... 358/1.14, 1.15, 1.13, 1.1
See application file for complete search history.

(56) References Cited

U.S. PATENT DOCUMENTS

| | | | | |
|---|---|---|---|---|
| 6,906,813 B1* | 6/2005 | Tuchitoi | ................ | G06F 3/1204 358/1.1 |
| 10,795,626 B2* | 10/2020 | Truong | .................. | G06F 3/1263 |
| 2004/0179105 A1* | 9/2004 | Endo | ................... | H04N 1/00188 348/211.1 |

FOREIGN PATENT DOCUMENTS

JP 2003-233275 A 8/2003

* cited by examiner

*Primary Examiner* — Douglas Q Tran
(74) *Attorney, Agent, or Firm* — Canon U.S.A., Inc. IP Division

(57) ABSTRACT

An image forming apparatus includes a job control unit configured to, in response to, during a period in which an output processing unit is performing printing of image data for a first print job, a reception unit receiving a second print job higher in degree of priority than the first print job, cause an input processing unit to interrupt acquisition of data for each page about the first print job.

21 Claims, 8 Drawing Sheets

FIG.4A

| TYPE OF JOB | DEGREE OF PRIORITY | POSSIBILITY OR IMPOSSIBILITY OF INTERRUPTION |
|---|---|---|
| COPY | HIGH | POSSIBLE |
| PDL | MEDIUM | POSSIBLE |
| FACSIMILE | LOW | IMPOSSIBLE |

FIG.4B

JOB INFORMATION

ID
TYPE
VARIOUS TYPES OF PRINT SETTING

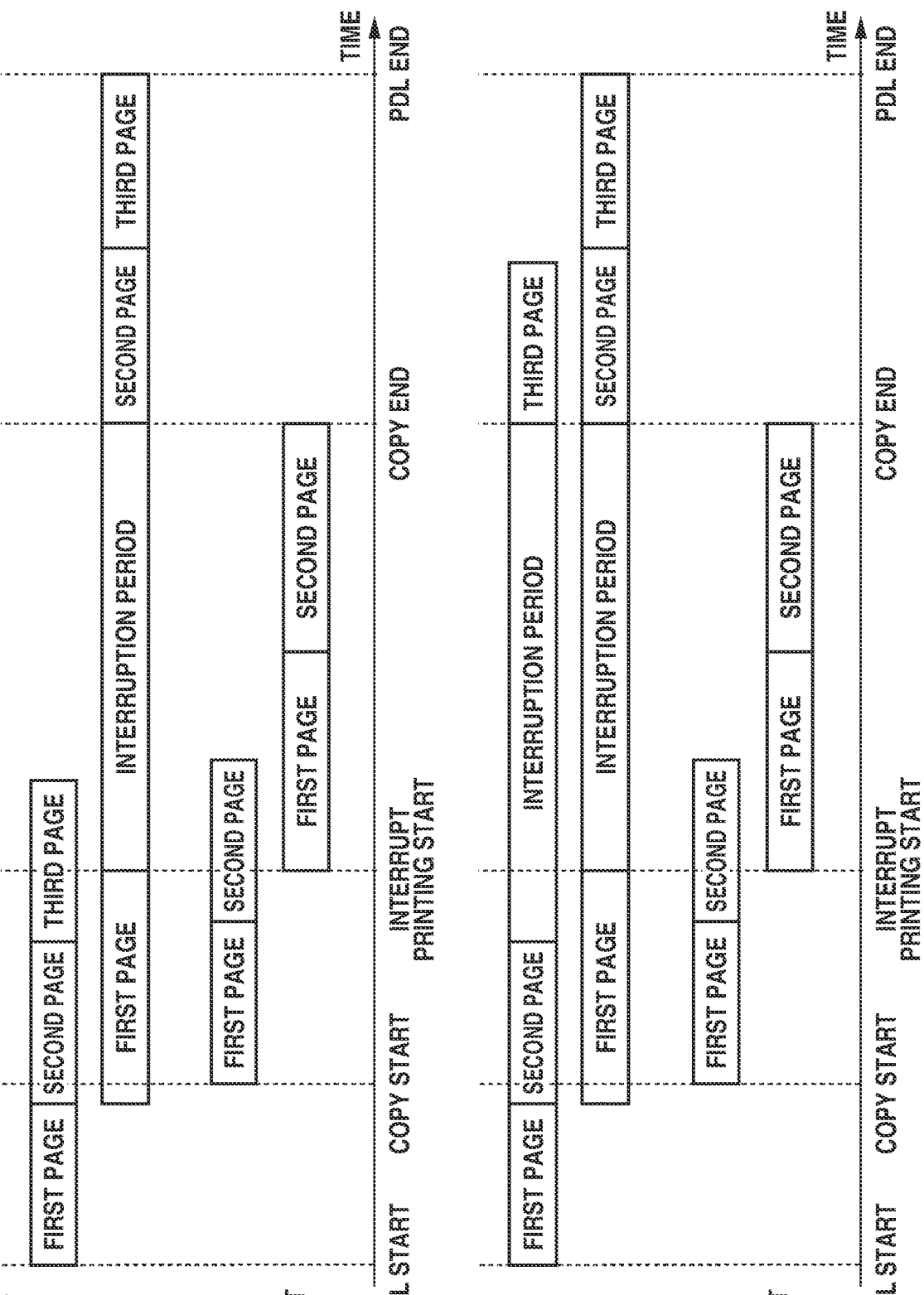

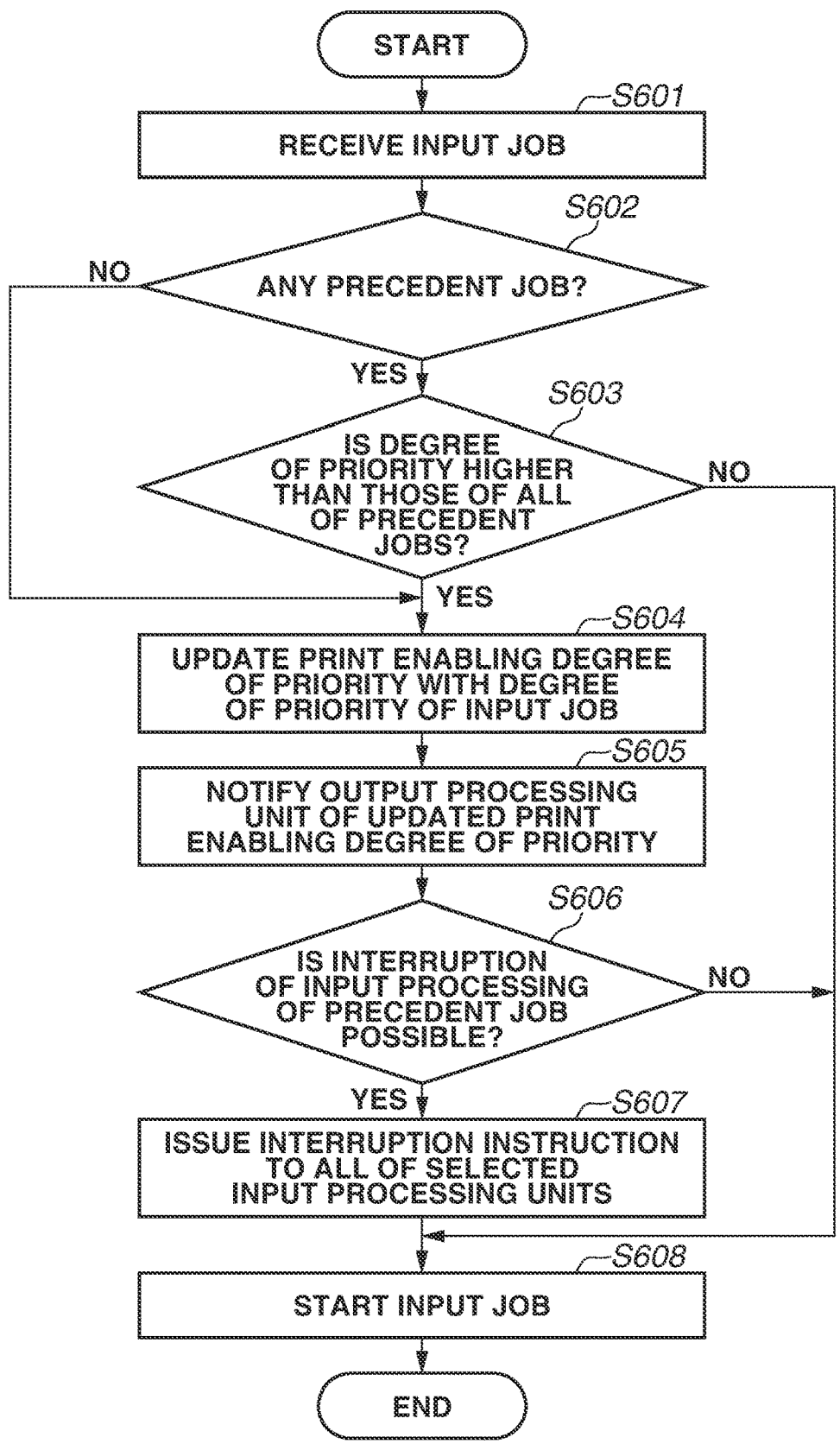

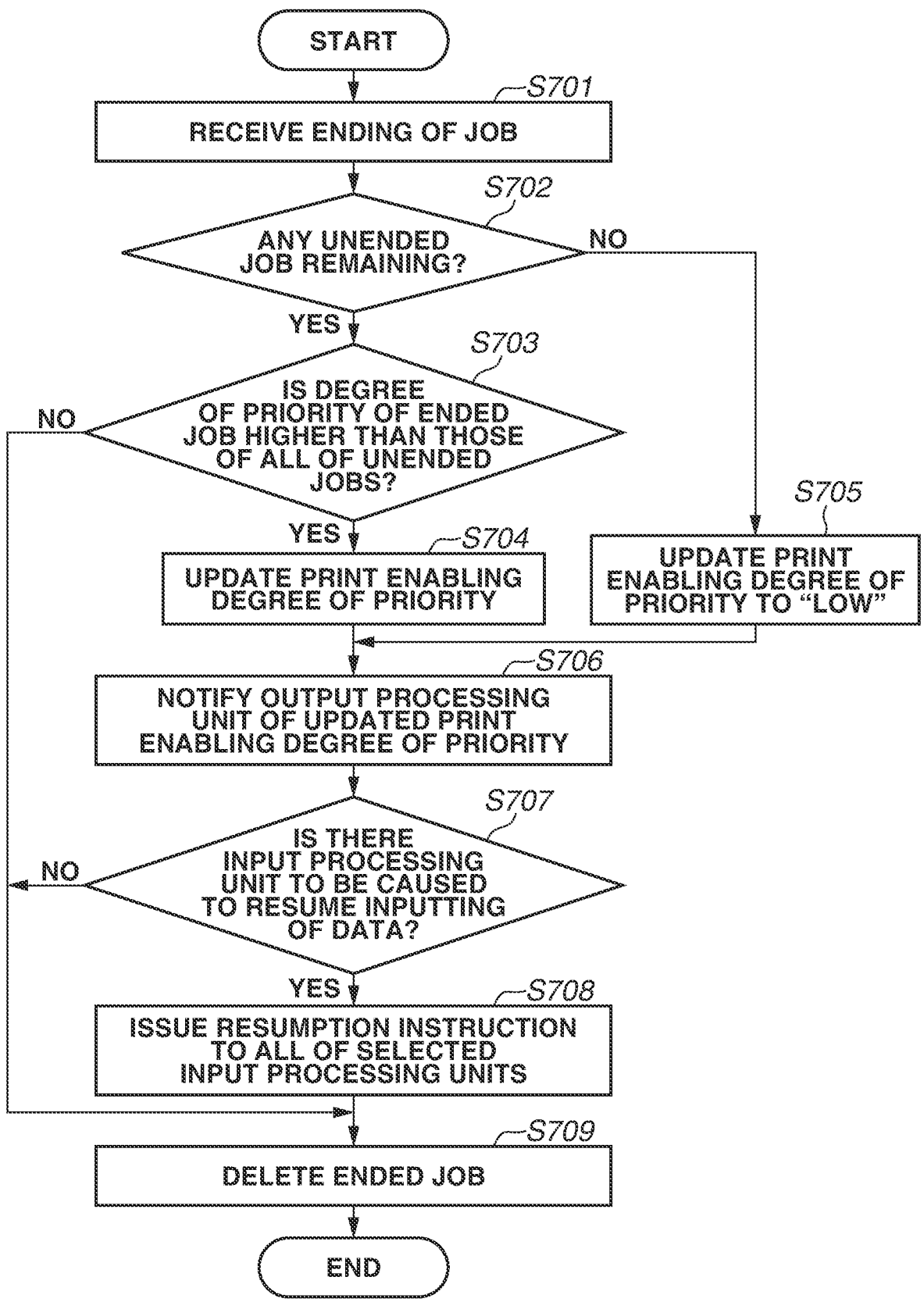

IMAGE FORMING APPARATUS AND CONTROL METHOD THEREFOR

BACKGROUND

Field of the Disclosure

Aspects of the present disclosure generally relate to an image forming apparatus and a control method therefor.

Description of the Related Art

With respect to a multifunction peripheral (MFP) having various functions serving as, for example, a copying machine, a printer, a facsimile, and a scanner, there may occur a case where a large number of processing requests (jobs) are issued together by an operator or operators via an operation unit of the MFP or via a network.

For example, Japanese Patent Application Laid-Open No. 2003-233275 discusses a configuration in which, upon receiving a large number of jobs, an MFP defines the ordering of priority between the jobs to control the respective jobs. In such a discussed configuration, upon receiving a high-priority job, the MFP performs control in such a way as to interrupt a low-priority job which is currently executed, then execute the high-priority job, and, after the high-priority job ends, resume the interrupted operation of the low-priority job.

SUMMARY

According to embodiments of the present disclosure, an image forming apparatus including a printing unit that prints image data on a sheet includes a reception unit configured to receive data about a print job on a page-by-page basis, a volatile storage unit configured to store data, an input processing unit configured to cause the storage unit to store data for each page about the print job via the reception unit and to generate image data from the stored data, an output processing unit configured to cause the printing unit to print the generated image data, and a job control unit configured to, in response to, during a period in which the output processing unit is performing printing of image data for a first print job, the reception unit receiving a second print job higher in degree of priority than the first print job, cause the input processing unit to interrupt acquisition of data for each page about the first print job.

Further features of the present disclosure will become apparent from the following description of exemplary embodiments with reference to the attached drawings.

BRIEF DESCRIPTION OF THE DRAWINGS

FIGS. 4A and 4B are diagrams respectively illustrating a table representing the degree of priority of a job and the possibility or impossibility of interruption of input processing and a table representing job information.

FIGS. 5A and 5B are diagrams respectively illustrating a timing chart in a comparative example and a timing chart in the exemplary embodiment.

FIG. 6 is a flowchart illustrating processing which is performed to start interrupt printing.

FIG. 7 is a flowchart illustrating processing which is performed to end interrupt printing.

DESCRIPTION OF THE EMBODIMENTS

Various exemplary embodiments, features, and aspects of the disclosure will be described in detail below with reference to the drawings. The following exemplary embodiments are not intended to limit the scope of the disclosure, and not all of the combinations of characteristics described in the respective exemplary embodiments are necessarily deemed to be essential. Furthermore, in the following exemplary embodiments, an image forming apparatus is used as an example of an information processing apparatus.

Figure 1:
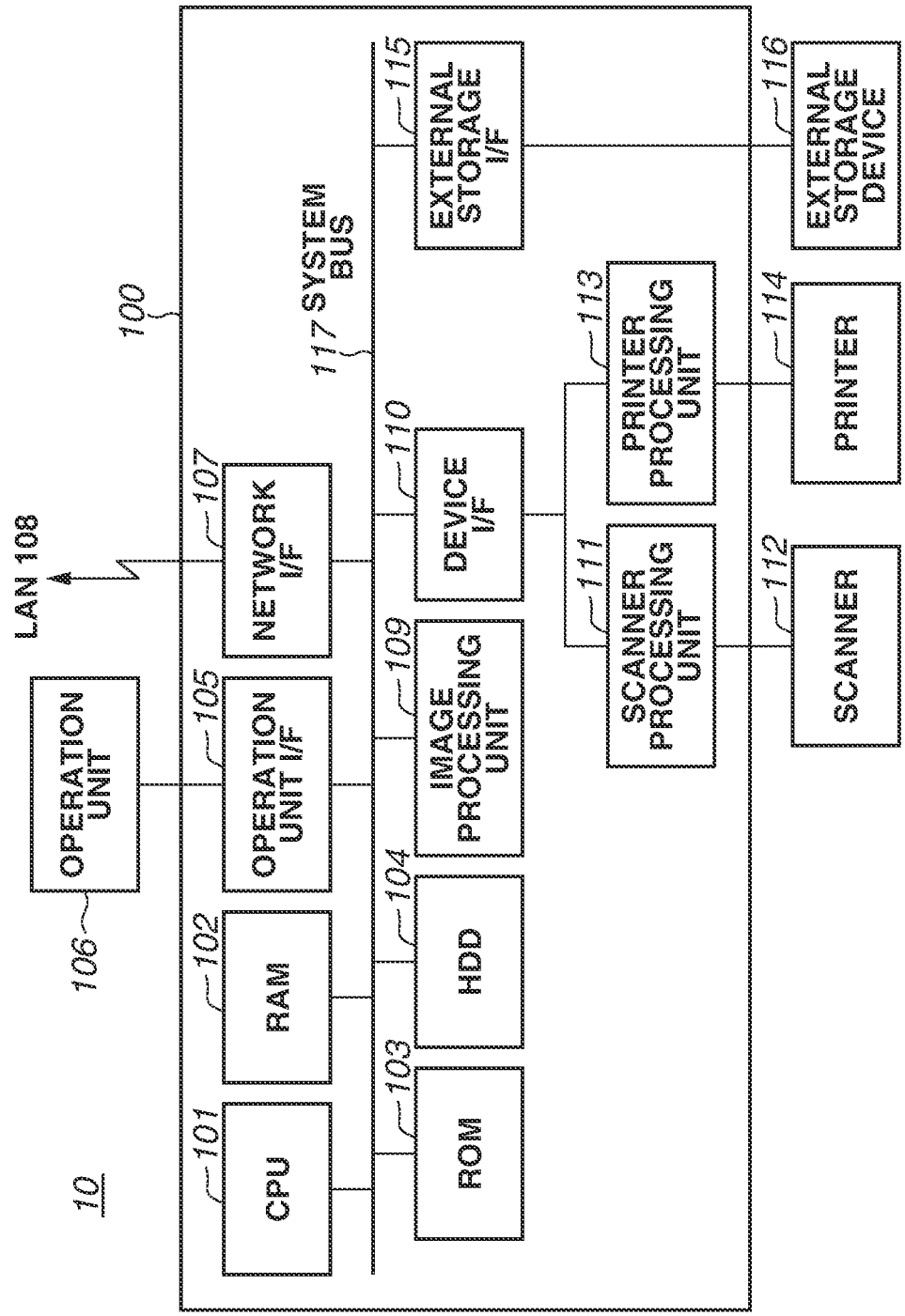
FIG. 1 is a diagram illustrating a hardware configuration of an image forming apparatus according to an exemplary embodiment of the present disclosure.

FIG. 1 is a diagram illustrating a hardware configuration of an image forming apparatus 10 according to an exemplary embodiment of the present disclosure. In the present exemplary embodiment, the image forming apparatus 10 is implemented as, for example, what is called a multifunction peripheral (MFP) in which a plurality of functions, such as a scan function and a print function, is integrated. The image forming apparatus 10 includes a controller unit 100, which controls the entire image forming apparatus 10, an operation unit 106, a scanner 112, and a printer 114.

The operation unit 106 includes, for example, a numeric keypad and various hardware keys for receiving inputting of an instruction for, for example, job execution from the user, and also includes a display panel for displaying, for example, apparatus information and job progress information or a setting screen for functions which the image forming apparatus 10 is capable of performing, to the user. The scanner 112 is an image input device which optically reads an image on an original set thereon. The printer 114 is an image output device which prints an image on a recording medium, such as a sheet of printing paper, based on image data.

The operation unit 106 is connected to an operation unit interface (I/F) 105 included in the controller unit 100. The scanner 112 and the printer 114 are connected to a scanner processing unit 111 and a printer processing unit 113, respectively, which are included in the controller unit 100. With such a configuration, the operation unit 106, the scanner 112, and the printer 114 operate while being controlled by the controller unit 100.

As needed, an external storage device 116 such as a Universal Serial Bus (USB) memory medium can be connected to the image forming apparatus 10. At this time, the external storage device 116 is connected to the image forming apparatus 10 via an external storage I/F 115, and operates while being controlled by the controller unit 100.

The controller unit 100 includes a central processing unit (CPU) 101, which comprehensively controls each block included in the controller unit 100. The CPU 101 is connected to a random access memory (RAM) 102, a read-only memory (ROM) 103, a hard disk drive (HDD) 104, the operation unit I/F 105, a network I/F 107, an image processing unit 109, a device I/F 110, and the external storage I/F 115 via a system bus 117.

The RAM 102, which is a general-purpose volatile RAM, is a memory for providing a work area for the CPU 101. Moreover, the RAM 102 includes a memory region for temporarily storing, for example, parameters and setting values and an image memory region for storing image data for each unit, such as on a page-by-page basis.

The ROM 103 is a general-purpose ROM, such as a boot ROM in which a system boot program is stored. The HDD 104, which is a general-purpose non-volatile HDD, stores, for example, a system software program, history data, image data, and tables. The functions of the image forming apparatus 10 are implemented by the CPU 101 reading out a program stored in the ROM 103 onto the RAM 102 and executing the program.

The operation unit I/F 105 is an interface for performing inputting and outputting of information between the controller unit 100 and the operation unit 106. The operation unit I/F 105 outputs display data to the operation unit 106 in response to an instruction from the CPU 101, and also transfers information input by the user via the operation unit 106 to the CPU 101.

The network I/F 107 is connected to a local area network (LAN) 108, which is a wired or wireless medium, and enables inputting and outputting of information between the image forming apparatus 10 and an apparatus existing on the LAN 108. The network I/F 107 retains the input information in a memory for temporary storage. The network I/F 107 has a configuration compatible with the LAN 108, and may have a configuration compatible with a short-distance wireless communication (for example, Near Field Communication) with a wireless communication distance of about several tens of centimeters. In that case, communication is mutually performed between the image forming apparatus 10 and a portable wireless terminal.

The image processing unit 109 performs general-purpose image processing. For example, the image processing unit 109 performs processing, such as enlargement or reduction, rotation, and conversion, on image data acquired from an external apparatus via the LAN 108. Moreover, the image processing unit 109 performs processing for rasterizing page-description language (PDL) code received via the LAN 108 into a bitmapped image. Moreover, in a case where the printer 114 performs outputting via the printer processing unit 113, the image processing unit 109 performs processing for converting image data, which is stored in the HDD 104 in a compressed and coded manner, into a format which is able to be processed by the printer processing unit 113.

The device I/F 110 is connected to the scanner 112 and the printer 114 via the scanner processing unit 111 and the printer processing unit 113, respectively, and performs conversion between a synchronous system and an asynchronous system of image data and transfer of, for example, setting values and adjustment values. Moreover, the device I/F 110 transfers status information about the scanner 112 or the printer 114 to the CPU 101. Such status information includes, for example, error information indicating, for example, a jam occurring in the scanner 112 or the printer 114.

The scanner processing unit 111 performs various processing operations associated with the scan function, such as correction, treatment, image area segmentation, scaling, and binarization, with respect to the read data read and input by the scanner 112. The scanner 112 includes an automatic continuous document feeding device (not illustrated) and a platen reading device (not illustrated) and is thus able to perform, for example, reading of an original placed on a document positioning glass plate and two-sided reading of a plurality of sheets of original. Moreover, sensors for detecting, for example, opening and closing of a feeding device cover (not illustrated), opening and closing of a document cover (not illustrated), the presence or absence of a document, and the size of a document are provided in the scanner 112. Detection signals output from such sensors and the status information about the scanner 112 are transmitted to the CPU 101 via the scanner processing unit 111 and the device I/F 110, so that the CPU 101 recognizes the status of the scanner 112, such as the occurrence of an error or the resolution of an error.

The printer processing unit 113 performs processing associated with the print function, such as output correction compatible with the output characteristic of the printer 114, resolution conversion, and adjustment of the printing position of an image, with respect to image data to be output for printing. The printer 114 includes one or more paper feed cassettes (not illustrated) for storing sheets of paper, one or more toner trays (not illustrated) for storing toner, and a paper feed unit (not illustrated) capable of sequentially feeding sheets of paper from each paper feed cassette on a sheet-by-sheet basis. Additionally, the printer 114 further includes a marking unit (not illustrated) for printing toner on the fed sheet of paper and a fixing unit (not illustrated) for fixing the toner printed by the marking unit with heat and pressure. Sensors for detecting, for example, the opening and closing status and the remaining quantity of sheets of paper of each paper feed cassette, the opening and closing status of each toner tray, opening and closing of a paper feed unit cover (not illustrated), the presence or absence of toner, and the position of a sheet of paper which is being fed are provided in the printer 114. Detection signals output from such sensors and the status information about the printer 114 are transmitted to the CPU 101 via the printer processing unit 113 and the device I/F 110, so that the CPU 101 recognizes the status of the printer 114, such as the occurrence of an error or the resolution of an error.

In a case where the external storage device 116 is connected to the image forming apparatus 10, the external storage I/F 115 performs reading of data stored in the external storage device 116 and writing of data to the external storage device 116 in response to an instruction from the CPU 101.

Figure 2:
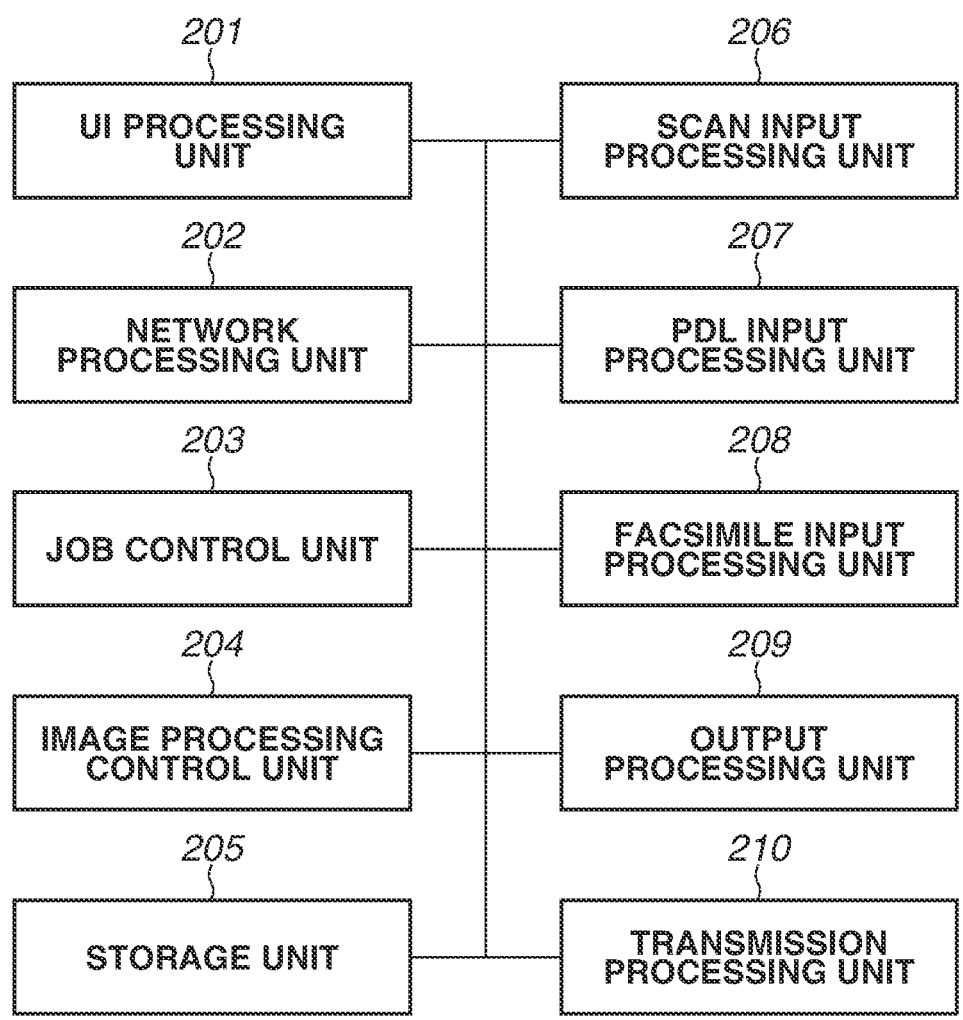
FIG. 2 is a diagram illustrating a software module configuration of the image forming apparatus according to the exemplary embodiment.

FIG. 2 is a diagram illustrating a software module configuration of the image forming apparatus 10 according to the present exemplary embodiment. Respective modules illustrated in FIG. 2 are implemented by the CPU 101 executing the program.

A user interface (UI) processing unit 201 performs processing related to the operation unit I/F 105 and the operation unit 106. The UI processing unit 201 communicates an operation performed by the user via the operation unit 106 to another module, and causes a screen to be displayed on the operation unit 106 in response to an instruction from another module. Moreover, the UI processing unit 201 performs, for example, editing of drawing data to be displayed on the operation unit 106.

A network processing unit 202 performs communication processing for communication with another apparatus existing on the LAN 108 via the network I/F 107. Upon receiving a control command or data from another apparatus existing on the LAN 108, the network processing unit 202 communicates such information to another module. Moreover, the network processing unit 202 transmits a control command or data to another apparatus existing on the LAN 108 in response to an instruction from another module.

A job control unit 203 controls other modules, thus comprehensively controlling execution of each job generated in the image forming apparatus 10, such as copy, print, or facsimile. When a job is input from the UI processing unit 201 or the network processing unit 202, the job control unit 203 determines the type of the input job and instructs an input processing unit adapted for the determined type to perform processing for generating an image for printing. For example, in a case where a copy job is input, the job control unit 203 issues an execution instruction to a scan input processing unit 206, and, in a case where PDL data is input, the job control unit 203 issues an execution instruction to a PDL input processing unit 207.

Each input processing unit generates an image on a page-by-page basis, stores the generated image in a storage unit 205, and then transmits a notification indicating that effect to the job control unit 203. Upon receiving the notification, the job control unit 203 instructs an output processing unit 209 to perform processing for printing the image on a recording medium. Repeating such a series of control operations a number of times corresponding to the number of pages of the job implements printing of the image.

An image processing control unit 204 performs processing related to the image processing unit 109. The image processing control unit 204 performs image processing using software and image processing using hardware including the image processing unit 109 in response to an instruction from each input processing unit or the output processing unit 209.

The storage unit 205 performs reading of data from the RAM 102 or the HDD 104 and writing of data to the RAM 102 or the HDD 104. The storage unit 205 performs setting of a job or storing of image data in response to an instruction from another module.

In response to an instruction from the job control unit 203, the scan input processing unit 206 controls the scanner processing unit 111 and the scanner 112 to perform reading processing of an original placed on the scanner 112. The scan input processing unit 206 controls the scanner processing unit 111 to perform image processing on the read image data (copy data), thus generating image data for printing. Moreover, the scan input processing unit 206 acquires status information about the scanner processing unit 111 and the scanner 112 and communicates the acquired status information to the job control unit 203. Moreover, when receiving an interruption instruction described below from the job control unit 203, the scan input processing unit 206 is able to interrupt reading processing of an original and image generation processing.

In response to an instruction from the job control unit 203, the PDL input processing unit 207 causes PDL data stored in the network I/F 107 via the network processing unit 202 to be stored in the RAM 102. Then, the PDL input processing unit 207 performs processing for analyzing the stored PDL data and rasterizing the PDL data into bitmapped image data on a page-by-page basis. The rasterized bitmapped image data is stored in a storage region by the storage unit 205. Moreover, when receiving an interruption instruction described below from the job control unit 203, the PDL input processing unit 207 is able to interrupt PDL analysis processing and image generation processing.

In response to an instruction from the job control unit 203, a facsimile input processing unit 208 causes facsimile data stored in the network I/F 107 via the network processing unit 202 to be stored in the RAM 102. Then, the facsimile input processing unit 208 performs processing for converting the stored facsimile data into binary image data on a page-by-page basis. The converted binary image data is stored in a storage region by the storage unit 205.

In response to an instruction from the job control unit 203, the output processing unit 209 controls the image processing control unit 204, the printer processing unit 113, and the printer 114 to perform appropriate image processing on image data generated by each input processing unit, thus performing processing for printing on a recording medium. Moreover, the output processing unit 209 acquires status information about the printer processing unit 113 and the printer 114 and communicates the acquired status information to the job control unit 203.

Moreover, although, while performing print processing for a job, the output processing unit 209 does not perform print processing for another job, only when receiving an update notification about the degree of priority described below from the job control unit 203, the output processing unit 209 can interrupt processing for the job which is in the process of printing and start processing for another job.

In response to an instruction from the job control unit 203, a transmission processing unit 210 controls the image processing control unit 204 and the network processing unit 202 to transmit an image to an apparatus existing on the LAN 108.

Figure 3:
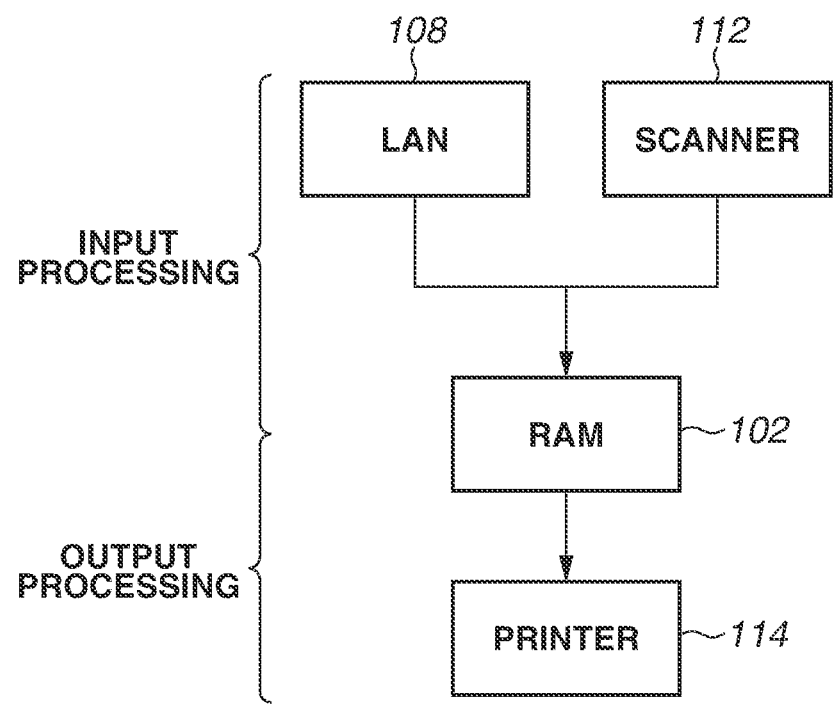
FIG. 3 is a diagram illustrating the flow of image data.

FIG. 3 is a diagram illustrating a transition of regions in which image data is stored from the time when input processing starts to the time when print processing ends. Interfaces from which data is input differ with the types of jobs. In the case of a copy job, data is input from the scanner 112, and, in the case of a PDL job or a facsimile job, data is input from the network I/F 107 via the LAN 108.

Image data for printing is generated by an input processing unit adapted for each job based on the input data. Each input processing unit generates image data with the RAM 102 used as a work area, and stores the completely processed image data for a page in the RAM 102.

The output processing unit 209 reads out image data stored in the RAM 102 onto a work area of the RAM 102 and performs required image processing on the image data, then printing the image data with the printer 114. When printing for the number of copies set in the job is completed, image data stored in the RAM 102 is deleted.

Accordingly, in the case of a configuration in which input processing units receive data in parallel, the state in which the RAM 102 is frequently being used may occur as compared with a case where a single input processing unit is operating. Details thereof are described below with reference to FIG. 5A.

FIG. 4A illustrates a degree-of-priority table in the present exemplary embodiment. The degree-of-priority table shows degree-of-priority information about each type of job used for an interrupt as an interrupt job in the image forming apparatus 10 and the possibility or impossibility of interrupting input processing (processing for generating an image for printing from the input information) of each job when an interrupt occurs by an input job. The input processing as used herein is, for example, the above-mentioned processing which is performed by the scan input processing unit 206, the PDL input processing unit 207, or the facsimile input processing unit 208.

The image forming apparatus 10 stores the degree-of-priority table in the RAM 102 or the HDD 104, and implements interrupt printing described below by referring to job information described below with the degree-of-priority table. In the present exemplary embodiment, a copy job in which the user operates a UI in front of an MFP and inputs a job is assumed to be set to the degree of priority "high", and, then, a PDL job is assumed to be set to the degree of priority "medium" and a facsimile job is assumed to be set to the degree of priority "low".

Furthermore, such rank order or level classification is merely an example, and is assumed to be changeable optionally in conformance with the present exemplary embodiment. Moreover, the types of jobs can also include other than the above three types. For example, with regard to an MFP having the function of printing data stored with a USB memory medium connected thereto, a USB memory medium print job can be added to the degree-of-priority table.

Moreover, with regard to the possibility or impossibility of interruption, scan input processing and PDL input processing are set to interruption being possible, and facsimile input processing is set to interruption being impossible. This is because, while each of scan input processing and PDL input processing is processing easy to redo because retransmission of a print job is easy, facsimile input processing is processing not easy to redo because retransmission is required to be requested to the sender. However, this setting of the possibility or impossibility is merely an example, and is assumed to be changeable optionally in conformance with the present exemplary embodiment. Moreover, depending on compatible types of jobs, another input processing unit may be added, and, in that case, an additional row can be added to the degree-of-priority table.

FIG. 4B is a conceptual diagram illustrating job information which is used for treating a job in the image forming apparatus 10. Each time a job is input, the job control unit 203 generates and stores job information in the storage unit 205 to control a plurality of jobs. An item "ID" is identification data (ID) unique for each job which the job control unit 203 allocates. An item "type" is designated by a module which inputs a job. For example, since copy is input from the UI processing unit 201, the UI processing unit 201 inputs a job to the job control unit 203 with "type" set as copy. Since PDL or facsimile is input from the network processing unit 202, the network processing unit 202 determines whether the job type is PDL or facsimile and then inputs a job to the job control unit 203 with "type" set as any of PDL and facsimile. Furthermore, the job type is determined by the CPU 101 checking "type" included in the job information.

An item "various types of print setting" is print setting included in a job input to each module, and is, for example, information concerning print setting, such as the number of print copies, paper size, and duplex/simplex.

FIGS. 5A and 5B are timing charts illustrating processing which is performed during interrupt printing. FIG. 5A illustrates processing operations in a conventional configuration serving as a comparative example, and FIG. 5B illustrates processing operations in a configuration of the present exemplary embodiment. Furthermore, here, a case where, during the process of printing of a PDL job for three pages, interrupt printing of a copy job for two pages is performed is described as an example.

FIG. 5A is an example of a timing chart for a conventional configuration in a case where, when the copy job is input as an interrupt, output processing of the PDL job is interrupted and input processing of the PDL job is not halted.

After PDL data for the first page of the PDL job is input, data for the subsequent pages (the second page and the third page) is successively input. The input data for the first page is stored in the RAM 102, and, when image data for the first page is generated by the PDL input processing unit 207, the generated image data is stored in the RAM 102. The output processing unit 209 reads out the generated image data for the first page and causes the printer 114 to perform print processing based on the read-out image data.

When a copy job is input during the process of printing for the first page of the PDL job, the output processing unit 209 temporarily interrupts print processing for PDL after printing for the first page of PDL ends. On the other hand, even if a copy job is input, the PDL input processing unit 207 receives inputting of data for the second page and data for the third page, as mentioned above, in parallel with inputting of data for the copy job. Then, the PDL input processing unit 207 generates pieces of image data corresponding to the respective pages and stores the generated pieces of image data in the RAM 102.

Moreover, the scan input processing unit 206 successively receives image data for the first page and image data for the second page of the copy job and then stores the received pieces of image data in the RAM 102. After image data for the first page of the copy job is stored in the RAM 102, the output processing unit 209 sequentially reads out the image data for the first page and causes the printer 114 to perform print processing for the first page. When printing of two pages in total of the copy job is completed, the output processing unit 209 sequentially reads out image data for the second page and image data for the third page of the PDL job, which have previously been stored in the RAM 102, and causes the printer 114 to sequentially perform print processing for the second page and the third page. Furthermore, image data for which print processing has ended is deleted from the RAM 102 as appropriate. Details thereof are described below with reference to FIG. 7.

Thus, in a conventional configuration, when a copy job which is input as an interrupt is performed, inputting of data for a PDL job during which an interrupt occurs is received in parallel with the copy job and image data generated based on the input data is stored in a RAM. With such a configuration employed, a memory capacity may become insufficient, so that, when a job is executed, a decrease in performance or a cancellation of the job may occur.

FIG. 5B is a timing chart for a configuration of the present exemplary embodiment in a case where, when a copy job is input as an interrupt, output processing of a PDL job is interrupted and input processing of the PDL job is also interrupted. Here, differences from the above-mentioned conventional configuration are described.

When a copy job is input during the process of printing for the first page of the PDL job (during the process of input processing for the second page of the PDL job), the output processing unit 209 temporarily interrupts print processing for the PDL job after printing for the first page of PDL ends, and starts print processing for the copy job. The PDL input processing unit 207 receives data for the second page of the PDL job which is being acquired, generates and stores image data for the second page in the RAM 102, and then interrupts inputting of the PDL job.

When printing of all of the pages of the copy job is completed, the PDL input processing unit 207 starts input processing which has been interrupted. Specifically, the PDL input processing unit 207 receives inputting of data for the third page of the PDL job and generates and stores image data for the third page in the RAM 102.

Furthermore, when interrupting input processing, without generating image data corresponding to data for the second page, the PDL input processing unit 207 can only store the data for the second page in the RAM 102. In that case, when starting input processing which has been interrupted, the PDL input processing unit 207 starts with processing for generating and storing image data for the second page in the RAM 102.

Thus, in a configuration of the present exemplary embodiment, when a copy job which is input as an interrupt is performed, input processing of a PDL job during which an interrupt occurs is interrupted until printing of the copy job is completed. With such a configuration employed, it is possible to allocate a sufficient memory capacity, so that the occurrence of a decrease in performance or a cancellation of the job can be prevented or reduced.

While, in the present exemplary embodiment, a case where a PDL job during which an interrupt occurs includes three pages in total has been described, as the number of pages which are in an unprinted state of the interrupted PDL job at the time when an interrupt occurs is larger, a greater advantageous effect can be obtained.

Furthermore, while, in the configuration illustrated in FIG. 5B, a configuration in which data for the second page of the PDL job, which has been in the process of input processing when a copy job is input as an interrupt, is stored as image data for printing in the RAM 102 has been described, the present exemplary embodiment is not limited to this configuration. For example, data obtained before being generated as image data for printing can be stored in the RAM 102. In that case, at the time of resumption, an input processing unit starts with processing for generating image data.

Figure 8A:
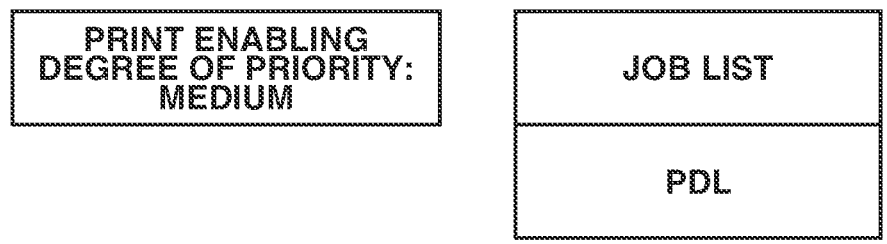
FIGS. 8A, 8B, and 8C are diagrams illustrating management states of a job control unit.

FIG. 6 is a flowchart illustrating processing which the image forming apparatus 10 performs to start interrupt printing. The flow of processing illustrated in FIG. 5B is described in detail with reference to FIG. 6. Processing illustrated in FIG. 6 is implemented by, for example, the CPU 101 reading out a program stored in the HDD 104 onto the RAM 102 and executing the program. In the following description, it is supposed that copy is input in a situation in which PDL is precedent. The state of the job control unit 203 obtained at the time of start of the processing is as illustrated in FIG. 8A. The state illustrated in FIG. 8A indicates that a PDL job is present in a job list. Moreover, the state illustrated in FIG. 8A indicates that management is performed in such a way as to perform a job having a degree of priority "medium" as a print enabling degree of priority. The "print enabling degree of priority" is information which the job control unit 203 always stores in the storage unit 205, and indicating prioritizing print processing of a job having a corresponding degree of priority.

For example, in a case where the "print enabling degree of priority" is "medium", the output processing unit 209 prioritizes not print processing of a facsimile job but print processing of a PDL job. Similarly, in a case where the "print enabling degree of priority" is "high", the output processing unit 209 prioritizes not print processing of a PDL job and print processing of a facsimile job but print processing of a copy job.

Figure 8B:
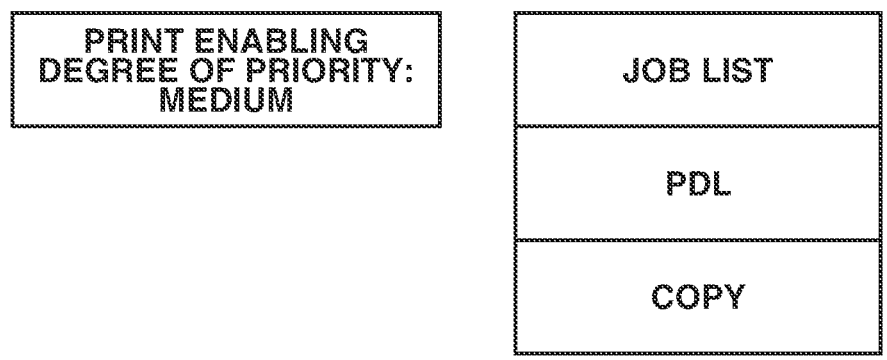

In step S601, the job control unit 203 receives a new job. In the following description, such a received new job is referred to as an "input job" in order to distinguish it from other jobs. The new job, which is a copy job, is input from the UI processing unit 201 to the job control unit 203. The new job, which is a PDL job or a facsimile job, is input from the network processing unit 202 to the job control unit 203. The job control unit 203 stores an ID, the type of a job, and various types of print setting as job information in the storage unit 205. The stored job information continues remaining until the job ends. The state of the job control unit 203 obtained at this point of time is as illustrated in FIG. 8B. The state illustrated in FIG. 8B indicates that a copy job has been added to the job list.

In step S602, the job control unit 203 determines whether there is a job which is being processed precedential to the input job (hereinafter referred to as a "precedent job"). If it is determined that there is a precedent job (YES in step S602), the job control unit 203 advances the processing to step S603. If it is determined that there is no precedent job (NO in step S602), the job control unit 203 advances the processing to step S604. In the present exemplary embodiment, PDL is present as a precedent job as illustrated in FIG. 8B.

In step S603, the job control unit 203 determines whether the degree of priority of the input job is larger than those of precedent jobs. This determination is performed with respect to all of the precedent jobs. The job control unit 203 determines the job types of the input job and the precedent jobs by referring to the above-mentioned degree-of-priority table. If it is determined that the degree of priority of the input job is larger than those of all of the precedent jobs (YES in step S603), the job control unit 203 advances the processing to step S604. If it is determined that the degree of priority of the input job is equal to or lower than those of all of the precedent jobs (NO in step S603), the job control unit 203 advances the processing to step S608.

In the present exemplary embodiment, since the degree of priority of the PDL job, which is a precedent job, is "medium" and the degree of priority of the copy job, which is an input job, is "high", the degree of priority of the input job is higher than that of the precedent job. Furthermore, in a case where the degree of priority of the precedent job and the degree of priority of the input job are equal to each other, the job control unit 203 performs processing of the jobs in the order of being input.

Figure 8C:
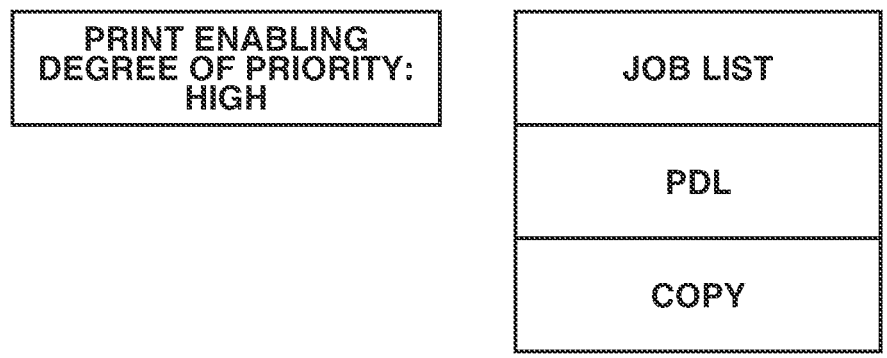

In step S604, the job control unit 203 updates the "print enabling degree of priority" with the degree of priority of the input job. Specifically, in the present exemplary embodiment, the job control unit 203 updates the original degree "medium" to the degree "high". The state of the job control unit 203 obtained at this point of time is as illustrated in FIG. 8C.

In step S605, the job control unit 203 notifies the output processing unit 209 of the updated "print enabling degree of priority". Upon receiving this notification, the output processing unit 209 causes the printer processing unit 113 to interrupt the current print processing and begins preparations for printing of the input job. The time to actually start printing of the input job is timing at which the input processing unit has completed image formation for the first page.

In step S606, the job control unit 203 determines whether interruption of input processing of the precedent job, during which the input job is input as an interrupt, is possible (i.e., performs interruption determination). In a case where the precedent job is, for example, a facsimile job, since interruption of input processing is impossible (NO in step S606), the job control unit 203 advances the processing to step S608. Thus, in a case where interruption of input processing of the precedent job is impossible, the job control unit 203 receives data for each page of the facsimile job and stores image data for each page generated by the facsimile input processing unit 208 in the RAM 102. In a case where the precedent job is a PDL job, since interruption of input processing is possible (YES in step S606), the job control unit 203 advances the processing to step S607.

In step S607, the job control unit 203 issues an interruption instruction to all of the input processing units selected in step S606. Each input processing unit, which has received the interruption instruction, immediately interrupts input processing of the job which is currently executed. Moreover, the input processing unit which has performed interruption also does not perform input processing of a subsequently input job. Moreover, in a case where the input processing unit which is previously performing interruption receives an interruption instruction, the received interruption instruction is ignored. In the present exemplary embodiment, the job control unit 203 issues an interruption instruction to the PDL input processing unit 207.

In step S608, the job control unit 203 notifies an input processing unit corresponding to the input job and the output processing unit 209 of starting of a job. This notification is performed to communicate an ID and settings of the job, and whether to actually perform input processing and print processing is determined by the state of each processing unit. For example, in a case where, while a PDL job is being executed, another PDL job is input, the PDL input processing unit 207 receives a notification indicating starting of a job but does not start input processing of the next job until input processing of the preceding job is completed.

As described above, in the present exemplary embodiment, when a job is input, to perform interrupt printing depending on the degree of priority, input processing of a precedent job is interrupted. This enables allocating a sufficient memory capacity during the process of interrupt printing, and thus enables preventing or reducing the occurrence of a decrease in performance or a cancellation of the job.

FIG. 7 is a flowchart illustrating processing which the image forming apparatus 10 performs to end interrupt printing. Processing illustrated in FIG. 7 is implemented by, for example, the CPU 101 reading out a program stored in the HDD 104 onto the RAM 102 and executing the program. In the following description, it is supposed that a PDL job is under interruption due to interrupt printing and such interrupt printing of a copy job has ended. The state of the job control unit 203 obtained at the time of start of the processing is as illustrated in FIG. 8C.

In step S701, the job control unit 203 receives ending of a job. The ending of a job includes, in addition to a case where all of the pages are normally printed, for example, a case where a cancel instruction is received from the user halfway through printing and a case where force quitting is performed due to an internal error.

In step S702, the job control unit 203 determines whether there is any unended job. If it is determined that there is any unended job (YES in step S702), the job control unit 203 advances the processing to step S703. If it is determined that there is no unended job (NO in step S702), the job control unit 203 advances the processing to step S705. In the present description, there is a PDL job as a job which is under interruption.

In step S703, the job control unit 203 derives the highest degree of priority out of those of the unended jobs according to the degree-of-priority table and then compares the derived degree of priority with the degree of priority of the ended job. If it is determined that the degree of priority of the ended job is higher than those of all of the unended jobs (YES in step S703), the job control unit 203 advances the processing to step S704. Otherwise (NO in step S703), the job control unit 203 advances the processing to step S709. In the present exemplary embodiment, since the ended job is a copy job (the degree of priority "high") and the unended job is a PDL job (the degree of priority "medium"), the job control unit 203 advances the processing to step S704.

In step S704, the job control unit 203 updates the "print enabling degree of priority" with the degree of priority derived in step S703. In the present exemplary embodiment, the job control unit 203 updates the original degree "high" to the degree "medium". Upon completion of updating, the job control unit 203 advances the processing to step S706.

In step S705, the job control unit 203 updates the "print enabling degree of priority" to "low". Since, in a case where the processing passes through step S705, there is no remaining job, the degree of priority "low" is fixed. Upon completion of updating, the job control unit 203 advances the processing to step S706.

In step S706, the job control unit 203 notifies the output processing unit 209 of the updated "print enabling degree of priority". This is the same processing as that in step S605 described above. In the present description, the job control unit 203 notifies the output processing unit 209 of the degree of priority "medium".

In step S707, if it is determined that there is an input processing unit to be caused to resume inputting of data (YES in step S707), the job control unit 203 advances the processing to step S708, and, if it is determined that there is no input processing unit to be caused to resume inputting of data (NO in step S707), the job control unit 203 advances the processing to step S709.

In step S708, the job control unit 203 issues a resumption instruction to all of the input processing units selected in step S707. Each input processing unit, which has received the resumption instruction, immediately resumes input processing of a job which is currently under interruption. Moreover, in a case where the input processing unit which is originally not under interruption receives a resumption instruction, the received resumption instruction is ignored. In the present exemplary embodiment, the job control unit 203 issues a resumption instruction to the PDL input processing unit 207. The state of the job control unit 203 obtained at this point of time is as illustrated in FIG. 8B.

In step S708, the job control unit 203 deletes the ended job and job information thereabout. The state of the job control unit 203 obtained at this point of time is as illustrated in FIG. 8A.

As described above, in the present exemplary embodiment, when interrupt printing has ended, to resume a job which is under interruption, it is possible to delete image data for an input job for which print processing has ended from the RAM 102. This enables, when executing a precedent job which has been resumed, allocating a sufficient memory capacity, and thus enables preventing or reducing the occurrence of a decrease in performance or a cancellation of the job.

While, in the above description, various examples and exemplary embodiments of the present disclosure have been described, the gist and scope of the present disclosure should not be construed to be limited to specific descriptions in the present specification.

Embodiments of the present disclosure can also be implemented by processing for supplying a program which implements one or more functions of the above-described exemplary embodiments to a system or apparatus via a network or a storage medium and causing one or more processors included in a computer of the system or apparatus to read and execute the program. Moreover, embodiments of the present disclosure can also be implemented by a circuit which implements such one or more functions (for example, an application specific integrated circuit (ASIC)).

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-182449 filed Oct. 2, 2019, which is hereby incorporated by reference herein in its entirety.

What is claimed is:

1. An image forming apparatus including a printer that prints image data on a sheet, the image forming apparatus comprising:
an operation unit configured to receive an execution instruction of a first-type print job;
a reception interface configured to receive data about a second-type print job on a page-by-page basis via a network;
a volatile memory configured to store a print job; and
a controller configured to perform control to receive data on a page-by-page basis and control to cause the printer to perform printing using image data generated based on the received page data in parallel during execution of the second-type print job,
wherein, in a case where a print job received during execution of the second-type print job is the first-type print job for which the operation unit receives the execution instruction, the controller interrupts reception of unreceived page data of the second-type print job, and executes the first-type print job, and
wherein, in a case where a print job received during execution of the second-type print job is different from the second-type print job, the controller continues reception of unreceived page data of the second-type print job.

2. The image forming apparatus according to claim 1, wherein, in response to printing of all of the pages of the first-type print job being completed, the controller resumes the execution of the second-type print job.

3. The image forming apparatus according to claim 1, wherein, in a case where a print job received during execution of the second-type print job is the first-type print job for which the operation unit receives the execution instruction, the controller interrupts reception of unreceived page data after receiving all of page data being received.

4. The image forming apparatus according to claim 3, wherein acquisition of data by the controller is resumed starting with acquisition of data for a page next to a page acquisition of which ends before acquisition of data is interrupted.

5. The image forming apparatus according to claim 1, wherein, in response to, during execution of the second-type print job, the reception interface receiving the first-type print job, the controller interrupts printing of data about the first-type print job.

6. The image forming apparatus according to claim 5, wherein, in response to printing of all of the pages of the first-type print job being completed, the controller resumes printing of data about the interrupted second-type print job.

7. The image forming apparatus according to claim 5, wherein acquisition of data by the controller is interrupted after printing of data which is being performed ends.

8. The image forming apparatus according to claim 3,
wherein the controller generates image data for each page from the acquired data,
wherein the memory stores the generated data for each page, and
wherein the controller reads out the data for each page stored in the memory and causes the printer to print the read-out data.

9. The image forming apparatus according to claim 3,
wherein the controller generates data about the first-type print job and causes the memory to store the generated image data, and
wherein, after issuing an instruction to resume the interrupted reception of page data, the controller deletes, from the memory, all of pieces of image data about the first-type print job the printing of which has been completed.

10. The image forming apparatus according to claim 1, wherein the controller is configured to compare degrees of priority of a plurality of print jobs received by the reception interface with each other, and, in response to, during execution of the second-type print job, the reception interface receiving a third-type job different from the second-type print job, the controller compares degrees of priority of the first print job and the different job with each other.

11. The image forming apparatus according to claim 10,
wherein the controller is configured to determine whether interruption of a print job which is to be interrupted by the controller is possible, and
wherein the second-type print job is a job interruption of which is determined to be possible by the controller.

12. The image forming apparatus according to claim 11, wherein determination by the controller is performed after comparison is performed.

13. The image forming apparatus according to claim 11,
wherein the reception interface includes a data reception interface configured to receive facsimile data,
wherein the controller is configured to perform input processing of facsimile data to generate image data for facsimile data, and
wherein interruption of a print job that is based on the facsimile data is impossible.

14. The image forming apparatus according to claim 13,
wherein the reception interface receives page-description language (PDL) data, wherein the controller is configured to perform input processing of PDL data to generate image data for PDL data, and wherein interruption of a print job that is based on the PDL data is possible.

15. The image forming apparatus according to claim 11, wherein interruption of the first-type print job is possible.

16. The image forming apparatus according to claim 1, further comprising a non-volatile storage configured to store degree-of-priority information used for managing degrees of priority of jobs, wherein the degree-of-priority information is information in which degrees of priority are managed for each type of job.

17. The image forming apparatus according to claim 1, wherein acquisition of data by the controller is interrupted after data which is being acquired is completely acquired and image formation of the acquired data ends.

18. The image forming apparatus according to claim 1, wherein acquisition of data by the controller is able to be interrupted before data which is being acquired is completely acquired and image formation of the acquired data is performed.

19. A control method for an image forming apparatus including an operation unit configured to receive an execution instruction of a first-type print job, a reception interface configured to receive data about a second-type print job on a page-by-page basis via a network, a volatile memory configured to store a print job, and a printer that prints image data on a sheet, the control method comprising:

performing control to receive data on a page-by-page basis;

performing control to cause the printer to perform printing using image data generated based on the received page data in parallel during execution of the second-type print job;

in a case where a print job received during execution of the second-type print job is the first-type print job for which the operation unit receives the execution instruction, performing control to interrupt reception of unreceived page data of the second-type print job, and execute the first-type print job; and in a case where a print job received during execution of the second-type print job is different from the second-type print job, performing control to continue reception of unreceived page data of the second-type print job.

20. The image forming apparatus according to claim 1, wherein the controller determines a type of the print job received during execution of the second-type print job, wherein, in a case where a result of the determination is the first-type print job, the controller interrupts the reception of the unreceived page data of the second-type print job, and executes the first-type print job, and wherein, in a case where the result of the determination is the second-type print job, the controller continues the reception of the unreceived page data of the second-type print job.

21. The image forming apparatus according to claim 1, wherein the first-type print job is a copy job, and wherein the execution instruction is an execution instruction to execute a copy job.

* * * * *